United States Patent
Maytal et al.

(10) Patent No.: US 6,715,079 B1
(45) Date of Patent: Mar. 30, 2004

(54) METHOD AND SYSTEM FOR SOFT MODEM PROTECTION

(76) Inventors: Binyamin Maytal, 6 Hatzabar St, Mevasseret Zion 90805 (IL); Shimon Ben-David, 16A Hakarkum St, Binyamina 30500 (IL); Yacov Bentkovski, 52 Jabotinsky St, Givatayim 53317 (IL)

( * ) Notice: Subject to any disclaimer, the term of this patent is extended or adjusted under 35 U.S.C. 154(b) by 0 days.

(21) Appl. No.: 09/238,198

(22) Filed: Jan. 27, 1999

(51) Int. Cl.[7] .......................... G06F 11/30; G06F 12/14; H04L 9/32
(52) U.S. Cl. ........................ 713/194; 380/266; 380/277; 380/259; 713/189; 713/192; 713/193; 705/57
(58) Field of Search ................................. 375/329, 332; 705/57; 380/201, 266; 714/38; 713/189, 192, 193, 194; 710/124, 3

(56) References Cited

U.S. PATENT DOCUMENTS

| | | | |
|---|---|---|---|
| 5,357,573 A | * 10/1994 | Walters ....................... 713/193 |
| 5,541,955 A | 7/1996 | Jacobsmeyer ................. 375/222 |
| 5,628,013 A | 5/1997 | Anderson et al. ............. 395/677 |
| 5,634,074 A | * 5/1997 | Devon et al. .................. 710/8 |
| 5,721,922 A | 2/1998 | Dingwall ....................... 395/673 |
| 6,263,075 B1 | * 7/2001 | Fadavi-Ardekani et al. ....................... 379/399.01 |
| 6,466,584 B1 | * 10/2002 | Maxwell et al. ............. 370/465 |

* cited by examiner

Primary Examiner—Gregory Morse
Assistant Examiner—Christopher J. Brown
(74) Attorney, Agent, or Firm—Eitan, Pearl, Latzer & Cohen Zedek LLP

(57) ABSTRACT

The present invention is a system and method for soft modem software protection using a key. The key is stored in a hardware device in the modem subsystem and transmitted to the central processing unit (CPU) in a designated time slot of a serial bus of a computer. In one embodiment, the key is stored as bit data in the registers of the modem codec. In another embodiment, the key is stored in a hardware device connected to the general purpose input output pins of the modem codec. In a further embodiment, the key is stored in a hardware device connected to the on/off hook and analog input connections of the modem codec. A second key is associated with the soft modem software. If the second key is incompatible with the transmitted key, the operation of the soft modem software is altered. Alternatively, the soft modem software is a customized version downloaded from an external computer to a local computer. The customized version has a unique identifier associated with the local computer associated with it.

29 Claims, 13 Drawing Sheets

| REG NUM | NAME | D15 | D14 | D13 | D12 | D11 | D10 | D9 | D8 |
|---|---|---|---|---|---|---|---|---|---|
| 00h | RESET | x | SE4 | SE3 | SE2 | SE1 | SE0 | ID9 | ID8 |
| 02h | MASTER VOLUME | MUTE | x | *ML5* | ML4 | ML3 | ML2 | ML1 | ML0 |
| 04h | HEADPHONE VOL | MUTE | x | *ML5* | ML4 | ML3 | ML2 | ML1 | ML0 |
| 06h | MASTER VOL MONO | MUTE | x | x | x | x | x | x | x |
| 08h | MASTER TONE | x | x | x | x | BA3 | BA2 | BA1 | *BOA* |
| 0Ah | PC_BEEP VOL | MUTE | x | x | x | x | x | x | x |
| 0Ch | PHONE VOLUME | MUTE | x | x | x | x | x | x | x |
| 0Eh | MIC VOLUME | MUTE | x | x | x | x | x | x | x |
| 10h | LINE IN VOLUME | MUTE | x | x | GL4 | GL3 | GL2 | GL1 | GL0 |
| 12h | CD VOLUME | MUTE | x | x | GL4 | GL3 | GL2 | GL1 | GL0 |
| 14h | VIDEO VOLUME | MUTE | x | x | GL4 | GL3 | GL2 | GL1 | GL0 |
| 16h | AUX VOLUME | MUTE | x | x | GL4 | GL3 | GL2 | GL1 | GL0 |
| 18h | PCM OUT VOL | MUTE | x | x | x | GL3 | GL2 | GL1 | GL0 |
| 1Ah | RECORD SECLECT | x | x | x | x | x | SL2 | SL1 | SL0 |
| 1Ch | RECORD GAIN | MUTE | x | x | x | GL3 | GL2 | GL1 | GL0 |
| 1Eh | RECORD GAIN MIC | MUTE | x | x | x | x | x | x | x |
| 20h | GENERAL PURPOSE | *POP* | ST | 3D | LD | *LLBK* | *RLBK* | MIX | MS |
| 22h | 3D CONTROL | x | x | x | x | CR3 | CR2 | CR1 | CR0 |
| 24h | MODEM RATE | R15 | R14 | R13 | R12 | R11 | R10 | R9 | R8 |
| 26h | POWERDOWN CTRL/STAT | PR7 | PR6 | PR5 | PR4 | PR3 | PR2 | PR0 | PR0 |
| 28h | RESERVED | x | x | x | x | x | x | x | x |
| ... | ... | ... | ... | ... | ... | ... | ... | ... | ... |
| 5Ah | VENDOR RESERVED | x | x | x | x | x | x | x | x |
| ... | ... | ... | ... | ... | ... | ... | ... | ... | ... |
| 7Ah | VENDOR RESERVED | x | x | x | x | x | x | x | x |
| 7Ch | VENDOR ID1 | F7 | F6 | F5 | F4 | F3 | F2 | F1 | F0 |
| 7Eh | VENDOR ID2 | T7 | T6 | T5 | T4 | T3 | T2 | T1 | T0 |

FIG.5A

| REG NUM | NAME | D7 | D6 | D5 | D4 | D3 | D2 | D1 | D0 | DEFAULT |
|---|---|---|---|---|---|---|---|---|---|---|
| 00h | RESET | ID7 | ID6 | ID5 | ID4 | ID3 | ID2 | ID1 | ID0 | na |
| 02h | MASTER VOLUME | x | x | MR5 | MR4 | MR3 | MR2 | MR1 | MR0 | 8000h |
| 04h | HEADPHONE VOL | x | x | MR5 | MR4 | MR3 | MR2 | MR1 | MR0 | 8000h |
| 06h | MASTER VOL MONO | x | x | MM5 | MM4 | MM3 | MM2 | MM1 | MM0 | 8000h |
| 08h | MASTER TONE | x | x | x | x | TR3 | TR2 | TR1 | TR0 | 0F0Fh |
| 0Ah | PC_BEEP VOL | x | x | x | PV4 | PV3 | PV2 | PV0 | x | x000h |
| 0Ch | PHONE VOLUME | x | x | GN5 | GN4 | GN3 | GN2 | GN1 | GN0 | 8088h |
| 0Eh | MIC VOLUME | x | 20dB | x | GN4 | GN3 | GN2 | GN1 | GN0 | 8088h |
| 10h | LINE IN VOLUME | x | x | x | GR4 | GR3 | GR2 | GR1 | GR0 | 8808h |
| 12h | CD VOLUME | x | x | x | GR4 | GR3 | GR2 | GR1 | GR0 | 8808h |
| 14h | VIDEO VOLUME | x | x | x | GR4 | GR3 | GR2 | GR1 | GR0 | 8808h |
| 16h | AUX VOLUME | x | x | x | GR4 | GR3 | GR2 | GR1 | GR0 | 8808h |
| 18h | PCM OUT VOL | x | x | x | x | x | SR2 | SR1 | SR0 | 0000h |
| 1Ah | RECORD SECLECT | x | x | x | x | GR3 | GR2 | GR1 | GR0 | 8000h |
| 1Ch | RECORD GAIN | x | x | x | x | GR3 | GR2 | GR1 | GR0 | 8000h |
| 1Eh | RECORD GAIN MIC | x | x | x | x | GM3 | GM2 | GM1 | GM0 | 8000h |
| 20h | GENERAL PURPOSE | LPBK | x | x | x | x | x | x | x | 0000h |
| 22h | 3D CONTROL | x | x | x | x | DP3 | DP2 | DP1 | DP0 | 0000h |
| 24h | MODEM RATE | R7 | R6 | R5 | R4 | R3 | R2 | R1 | R0 | 0000h |
| 26h | POWERDOWN CTRL/STAT | x | x | x | MDM | REF | ANL | DAC | ADC | na |
| 28h | RESERVED | x | x | x | x | x | x | x | x | x |
| ... | ... | ... | ... | ... | ... | ... | ... | ... | ... | ... |
| 5Ah | VENDOR RESERVED | x | x | x | x | x | x | x | x | x |
| ... | ... | ... | ... | ... | ... | ... | ... | ... | ... |
| 7Ah | VENDOR RESERVED | x | x | x | x | x | x | x | x | x |
| 7Ch | VENDOR ID1 | S7 | S6 | S5 | S4 | S3 | S2 | S1 | S0 | na |
| 7Eh | VENDOR ID2 | REV7 | REV6 | REV5 | REV4 | REV3 | REV2 | REV1 | REV0 | na |

FIG. 5B

METHOD AND SYSTEM FOR SOFT MODEM PROTECTION

FIELD OF THE INVENTION

The present invention generally to soft modems and relates to protection for soft modems, in particular.

BACKGROUND OF THE INVENTION

Soft modems, also known as host based modems, have been in existence since 1995. In such modems, all the required processing is done in software on the host CPU (central processing unit) of a computer, for example such as a PC (personal computer). Certain hardware is still required for soft modems, as shown in FIG. 1, to which reference is now made. FIG. 1 is a schematic illustration of a prior art PC, comprising a motherboard 10, an audio subsystem 12 and a modem subsystem 14. The motherboard 10 comprises a main PC bus 16, a host CPU 18, and a memory 20. The motherboard further comprises a first chip set 22 for interfacing to the host CPU 18 and the main PC bus 16, and a second chip set 24 for interfacing to the main PC bus 16 and additional buses. The main PC bus 16 is, for example, a Peripheral Component Interconnect (PCI) bus or an Industry Standard Architecture (ISA) bus or any other central PC bus.

An external telephone line (not shown) is connected to the modem subsystem 14. Electrical audio signals from the telephone line are processed by a data access arrangement (DAA) 26 and are converted from analog to digital by a modem codec (analog to digital coder and digital to analog decoder) 28. The modem subsystem 14 also includes a digital modem interface device 30 which controls the modem codes 28 and the DAA 26, interfaces to the main PC bus 16, and provides signal buffering and control means.

The software instructions of a soft modem are loaded into the memory 20, from which they are accessed and executed by the host CPU 18. When the host CPU 18 needs to communicate with the components of the modem subsystem 14, it sends messages via the first chip set 22 directly to the modem interface device 30. The messages are compatible with the protocol of the main PC bus 16.

Similarly, the audio subsystem 12 comprises an audio codec (analog to digital coder and digital to analog decoder) 32 and an audio processing device 34 which controls the audio codec 32 and interfaces to the main PC bus 16. Applications using the components of the audio subsystem 12 include for example, recording sounds from a microphone and producing sounds through a speaker.

A soft modem manufacturer typically sells both soft modem software and a customized modem interface device to a PC manufacturer, so that the customized modem interface device may be integrated into the modem subsystem of the PC. Since the customized modem interface device is an essential hardware component, without which the soft modem software is inoperable, this arrangement provides some protection to the soft modem manufacturer.

In 1997, Intel Corporation of California, USA published a new standard, called AC'97, which establishes a standard interface, called AC-link, to audio and modem codecs. The AC'97 standard also establishes a standard way of programming the audio and modem codecs. Furthermore, Intel announced in 1998 that its future chip set, samples of which are currently available, will include an integrated modem interface device and an audio processing device, both compatible with the AC-link protocol.

This is shown in FIG. 2, to which reference is now made, which is a schematic illustration of an AC-link compatible PC, as described by Intel. Since the AC-link compatible PC is similar to the PC of FIG. 1, similar reference numerals refer to similar elements in the figure. The AC-link compatible PC comprises a motherboard 40, an audio subsystem 42 and a modem subsystem 44. The motherboard 40 includes a second chip set 46 for interfacing to the main PC bus 16 and additional buses. It is this second chip set 46 which includes an integrated modem interface device and an integrated audio processing device, both of which are AC-link compatible.

The modem subsystem 44 comprises only an AC-link compatible modem codec 48 and the DAA 26. Similarly, the audio subsystem 42 includes only an AC-link compatible audio codec 50. It will be appreciated that the modem subsystem 44 and audio subsystem 42 are expected to be smaller and less expensive than the modem subsystem 14 and audio subsystem 12, respectively, of FIG. 1.

There is also an option for an AC-link compatible, combined audio modem codec (AMC), in place of the separate audio codec 50 and modem codec 48.

A soft modem implemented on a PC whose chip set includes an integrated, AC-link compatible, modem interface device does not require that the PC have additional, customized, digital interface components. Rather, the PC has a standard chip set which is sold by a third party. The modem codec, audio codec and DAA are also standard and sold by third parties. The interface to the codecs is accomplished through the AC-link protocol, which is a serial bus with a pre-determined slot allocation. Since the PC already has all the required hardware, the soft modem manufacturer needs only provide the soft modem software, which reduces the cost and eases the implementation. In this arrangement, however, the soft modem software manufacturer is vulnerable to having the software illegally reproduced.

SUMMARY OF THE INVENTION

An object of the present invention is to protect soft modem software in a computer system having a serial bus with designated time slots.

There is therefore provided in accordance with a preferred embodiment of the present invention, a system for transmitting a key for soft modem software protection over a serial bus of a computer having a CPU and a hardware device. The serial bus has designated time slots. The system includes a storage unit in the hardware device for storing a representation of the key therein, and means for transmitting the representation from the hardware device to the CPU over at least one of the designated time slots.

There is also provided in accordance with a preferred embodiment of the present invention, a system which uses a key for soft modem software protection on a computer. The computer has a CPU, a modem codec having registers, and a serial bus having designated time slots, at least one of the time slots being designated for data of the registers. The system includes bit data of the key stored in a subset of the bits of at least one of the registers, and means for transmitting the bit data from the at least one register to the CPU in the at least one register data time slot.

Moreover, in accordance with a preferred embodiment of the present invention, the key is encrypted.

Furthermore, in accordance with a preferred embodiment of the present invention, the system further includes a second key associated with the soft modem software, and means for altering operation of the soft modem software if the transmitted bit data is incompatible with the associated second key.

Additionally, in accordance with a preferred embodiment of the present invention, the means for alteration includes at least one of the following: means for stopping execution of the soft modem software, means for limiting the operation of the soft modem software to a predetermined service level, and means for changing data samples passing through the soft modem software at a predefined magnitude and frequency.

Furthermore, in accordance with a preferred embodiment of the present invention, the means for alteration is configured to become operative a predetermined amount of time after the soft modem software becomes operative.

Alternatively, in accordance with a preferred embodiment of the present invention, the means for alteration is configured to become operative a random amount of time after the soft modem software becomes operative.

There is also provided in accordance with a preferred embodiment of the present invention, a system which uses a key for soft modem software protection on a computer. The computer has a CPU, a modem codec having general purpose input output (GPI/O) pins, a hardware device connected to the GPI/O pins, and a serial bus having designated time slots. At least one of the time slots is designated for GPI/O read data and at least one of the time slots is designated for GPI/O write data. The system includes bit data of the key stored in the hardware device, means for transmitting at least one control signal from the CPU to the modem codec over the at least one time slot designated for GPI/O write data, means for transmitting the at least one control signal from the modem codec to the hardware device over the GPI/O output pin, means for reading the bit data from the hardware device to the modem codec over the GPI/O input pin, and means for transmitting the bit data from the modem codec to the CPU over the at least one GPI/O read data time slot.

There is also provided, in accordance with a preferred embodiment of the present invention, a system which uses a key for soft modem software protection on a computer. The computer has a CPU, a modem codec having an on/off hook pin and an analog input pin, a hardware device connected to the on/off hook pin and the analog input pin, and a serial bus having designated time slots. At least one of the time slots is designated for analog input data and at least one of the time slots is designated for GPI/O write data. The system includes bit data of the key stored in the hardware device, means for transmitting at least one control signal from the CPU to the modem codec over the at least one time slot designated for GPI/O write data, means for transmitting at least one trigger signal from the modem codec to the hardware device over the on/off hook pin, means for reading the bit data from the hardware device to the modem codec over the analog input pin, and means for transmitting the bit data from the modem codec to the CPU over the at least one analog input data time slot.

There is also provided, in accordance with a preferred embodiment of the present invention, a system for protecting soft modem software on a computer having a CPU. The system includes a first key associated with the soft modem software, a second key stored in a hardware device on the computer, means for transmitting the second key from the hardware device to the CPU, and means for altering operation of the soft modem software if the transmitted second key is incompatible with the associated first key.

Preferably, in accordance with a preferred embodiment of the present invention, at least one of the keys is encrypted.

There is also provided, in accordance with a preferred embodiment of the present invention, a system for protecting soft modem software, the system including a local computer having a unique key, and an external computer. The external computer receives the key from the local computer when the local computer accesses the external computer in order to download the software. The external computer embeds information related to the key in a customized version of the software, and downloads the customized version to the local computer. The system also includes means for altering operation of the customized version. The means for altering includes at least one of a group including the following: means for stopping execution of the customized version, means for limiting the operation of the customized version to a predetermined service level, and means for changing data samples passing through the customized version in a magnitude and frequency which prevents useful communication.

Preferably, in accordance with a preferred embodiment of the present invention, the means for alteration is configured to become operative a predetermined amount of time after the customized version becomes operative.

Alternatively, in accordance with a preferred embodiment of the present invention, the means for alteration is configured to become operative a random amount of time after the customized version becomes operative.

There is also provided, in accordance with a preferred embodiment of the present invention, a method which uses a key for soft modem software protection on a computer. The computer has a CPU, a modem codec having registers, and a serial bus having designated time slots. At least one of the time slots is designated for data of the registers. The method comprises the steps of storing bit data of the key in a subset of the bits of at least one of the registers, and transmitting the bit data from the at least one register to the CPU in the at least one register data time slot.

Preferably, in accordance with a preferred embodiment of the present invention, the key is encrypted.

Furthermore, in accordance with a preferred embodiment of the present invention, the method further includes the steps of associating a second key with the soft modem software, and altering operation of the soft modem software if the transmitted bit data is incompatible with the second key.

Moreover, in accordance with a preferred embodiment of the present invention, the alteration step includes at least one of the following steps: stopping execution of the soft modem software, limiting the operation of the soft modem software to a predetermined service level, and changing data samples passing through the soft modem software at a predefined magnitude and frequency.

Additionally, in accordance with a preferred embodiment of the present invention, the alteration step begins a predetermined amount of time after operation of the soft modem software begins.

Alternatively, in accordance with a preferred embodiment of the present invention, the alteration step begins a random amount of time after operation of the soft modem software begins.

There is also provided, in accordance with a preferred embodiment of the present invention, a method which uses a key for soft modem software protection on a computer. The computer has a CPU, a modem codec having general purpose input output (GPI/O) pins, a hardware device connected to the GPI/O pins, and a serial bus having designated time slots. At least one of the time slots is designated for GPI/O read data and at least one of the time slots is designated for GPI/O write data. The method includes the steps of storing bit data of the key in the hardware device, transmitting at least one control signal from the CPU to the modem codec over the at least one time slot designated for GPI/O write data, transmitting the at least one control signal from the modem codec to the hardware device over the GPI/O output pin, reading the bit data from the hardware device to the modem codec over the GPI/O input pin, and transmitting the bit data from the modem codec to the CPU over the at least one GPI/O read data time slot.

There is also provided, in accordance with a preferred embodiment of the present invention, a method which uses a key for soft modem software protection on a computer. The computer has a CPU, a modem codec having an on/off hook pin and an analog input pin, a hardware device connected to the on/off hook pin and the analog input pin, and a serial bus having designated time slots. At least one of the time slots is designated for analog input data and at least one of the time slots is designated for GPI/O write data. The method includes the steps of storing bit data of the key in the hardware device, transmitting at least one control signal from the CPU to the modem codec over the at least one time slot designated for GPI/O write data, transmitting the at least one trigger signal from the modem codec to the hardware device over the on/off hook pin, reading the bit data from the hardware device to the modem codec over the analog input pin, and transmitting the bit data from the modem codec to the CPU over the at least one analog input data time slot.

There is also provided, in accordance with a preferred embodiment of the present invention, a method for protecting soft modem software on a computer having a CPU, a serial bus having designated time slots, and a modem subsystem. The method includes the steps of associating a first key with the soft modem software, storing a second key in a hardware device in the modem subsystem, transmitting the second key from the hardware device to the CPU in at least one of the designated time slots, and altering operation of the soft modem software if the transmitted second key is incompatible with the associated first key.

Preferably, in accordance with a preferred embodiment of the present invention, at least one of the keys is encrypted.

Moreover, in accordance with a preferred embodiment of the present invention, the alteration step includes at least one of the following steps: stopping execution of the soft modem software, limiting the operation of the soft modem software to a predetermined service level, and changing data samples passing through the soft modem software at a predefined magnitude and frequency.

Furthermore, in accordance with a preferred embodiment of the present invention, the alteration step begins a predetermined amount of time after operation of the soft modem software begins.

Alternatively, in accordance with a preferred embodiment of the present invention, the alteration step begins a random amount of time after operation of the soft modem software begins.

There is also provided, in accordance with a preferred embodiment of the present invention, a method for protecting soft modem software to be downloaded from an external computer to a local computer having a unique key. The method includes the steps of sending the unique key to the external computer, generating a customized version of the modem software with which the key is associated, downloading the customized version to the local computer, reading the unique key from the local computer, and altering operation of the customized version if the read key is incompatible with the associated key. The alteration step includes at least one of the following steps: stopping execution of the customized version, limiting the operation of the customized version to a predetermined service level, and changing data samples passing through the customized version at a predefined magnitude and frequency.

Preferably, in accordance with a preferred embodiment of the present invention, the alteration step begins a predetermined amount of time after operation of the customized version begins.

Alternatively, in accordance with a preferred embodiment of the present invention, the alteration step begins a random amount of time after operation of the customized version begins.

BRIEF DESCRIPTION OF THE DRAWINGS

The present invention will be understood and appreciated more fully from the following detailed description taken in conjunction with the appended drawings in which:

FIGS. 5A and 5B are a table of the codec register indices and usage according to the AC'97 AC-link specification, showing the assignment of key data to modem codec register bits unused by the AC'97 AC-link specification, in accordance with a preferred embodiment of the present invention;

DETAILED DESCRIPTION OF THE PRESENT INVENTION

Figure 1:
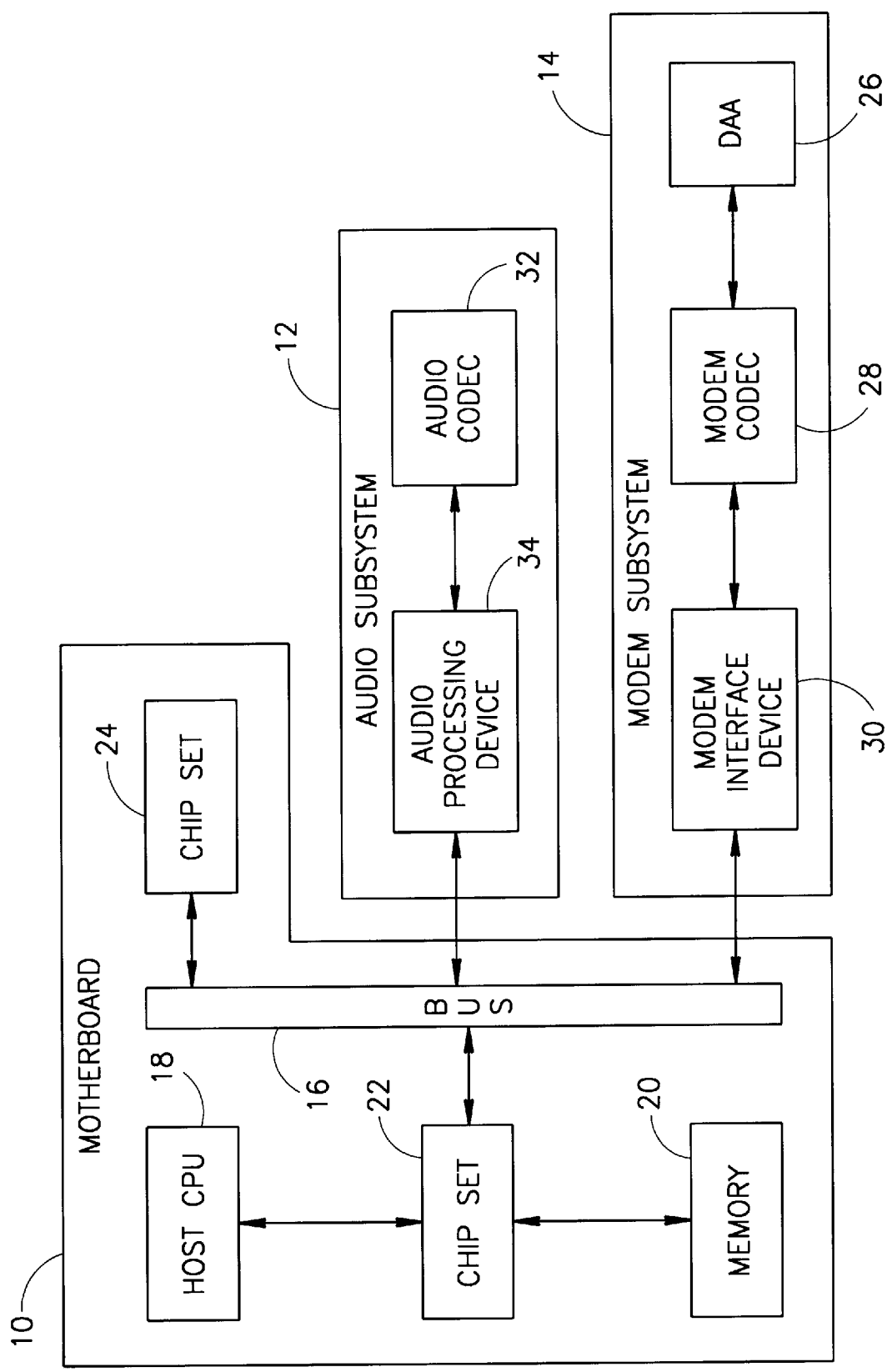
FIG. 1 is a schematic illustration of a prior art personal computer (PC)

The present invention describes a variety of systems and methods that can be used to protect soft modem software used on a computer having a serial bus with designated time slots.

For the purposes of clarity of the present specification, the term modem codec will be used. It will be appreciated that the present invention applies equally well to combined audio/modem codecs (AMC).

According to the present invention, the software protection is based upon a specific key. The key can be encrypted or given in a straightforward format. The key can be provided in a number of ways. In accordance with a preferred embodiment of the present invention, the key is provided through the assignment of bit data to bits of at least one register in the modem codec, as will be discussed in more detail hereinbelow with respect to FIGS. 4, 5A and 5B. According to another preferred embodiment of the present invention, the key is provided through an additional chip, where access to the chip is provided via the GPI/O (general purpose input/output) pins of the modem codec, as will be discussed in more detail hereinbelow with respect to FIGS. 6, 7 and 8. According to a further preferred embodiment of the present invention, the key is provided through an additional chip, where the chip is triggered through the on/off hook and read through analog input connections of the modem codec, as will be discussed in more detail hereinbelow with respect to FIGS. 9, 10 and 11. According to an additional preferred embodiment of the present invention, the key is provided from a unique identifier attached to the CPU (central processing unit) of the computer, as will be discussed in more detail hereinbelow with reference to FIG. 12.

According to the present invention, the host CPU receives the key, and handles it in order to provide protection. In accordance with a preferred embodiment of the present invention, the host CPU controls the operation of the soft modem. If the key received by the host CPU is incompatible with the key known to the soft modem software, the soft modem software will not operate.

In accordance with another preferred embodiment of the present invention, the host CPU controls the service level of the soft modem. If the key received by the host CPU is incompatible with the key known to the soft modem software, the soft modem software reduces the level of service provided. For example, the modem speed could be reduced from 56 kbps (kilobytes per second) to 33 kbps. Other methods of changing the service level are described in U.S. Pat. No. 6,092,095 and U.S. Pat. No. 6,463,094, which are incorporated herein by reference.

In accordance with a further preferred embodiment of the present invention, the host CPU controls the quality of the data processed by the soft modem. If the key received by the host CPU is incompatible with the key known to the soft modem software, the soft modem software tampers with the data processed by the soft modem. For example, the incoming and outgoing samples are randomly tampered with at a frequency that will be high enough to cause communication problems, since errors on the received bits will prevent useful communication.

It will be appreciated by persons skilled in the art that, in order to further hinder potential detection and breaking of the key, the key handling methods described hereinabove could begin operation only after a given period of time.

It will also be appreciated by persons skilled in the art that any combination of the key handling methods described hereinabove is also within the scope of the present invention.

Figure 3:
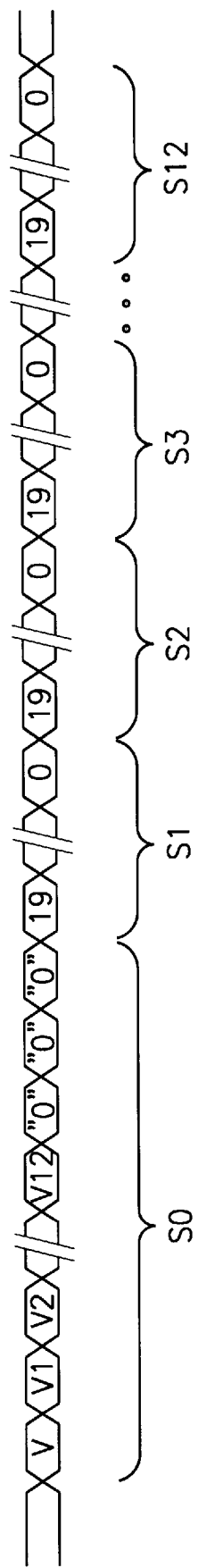
FIG. 3 is a schematic illustration of the format of the audio output frame according to the AC-link protocol.

Reference is now made to FIG. 3, which is a schematic illustration of the format of the audio frame according to the AC-link protocol. The AC-link bus is a serial bus with designated time slots. FIG. 3 shows a data signal. The data signal comprises a 16-bit reserved time slot S0 and twelve 20-bit time slots, S1–S12. The first bit V of slot S0 indicates whether there is valid data in the current audio frame. The next twelve bits V1–V12 of slot S0 indicate whether the respective time slot S1–S12 contains valid data. The allocation of the twelve 20-bit time slots S1–S12 for input (i.e. a frame received from the codec) is as follows: one slot for the address of the codec register, one slot for the data of the codec register, five slots for audio samples, four slots for modem data, and one slot for GPI/O. The allocation of the twelve 20-bit time slots S1–S12 for output (i.e. a frame received by the codec) is as follows: one slot for the address of the codec register, one slot for the data of the codec register, four slots for audio samples, three slots for optional use, two slots for modem data, and one slot for GPI/O.

Figure 2:
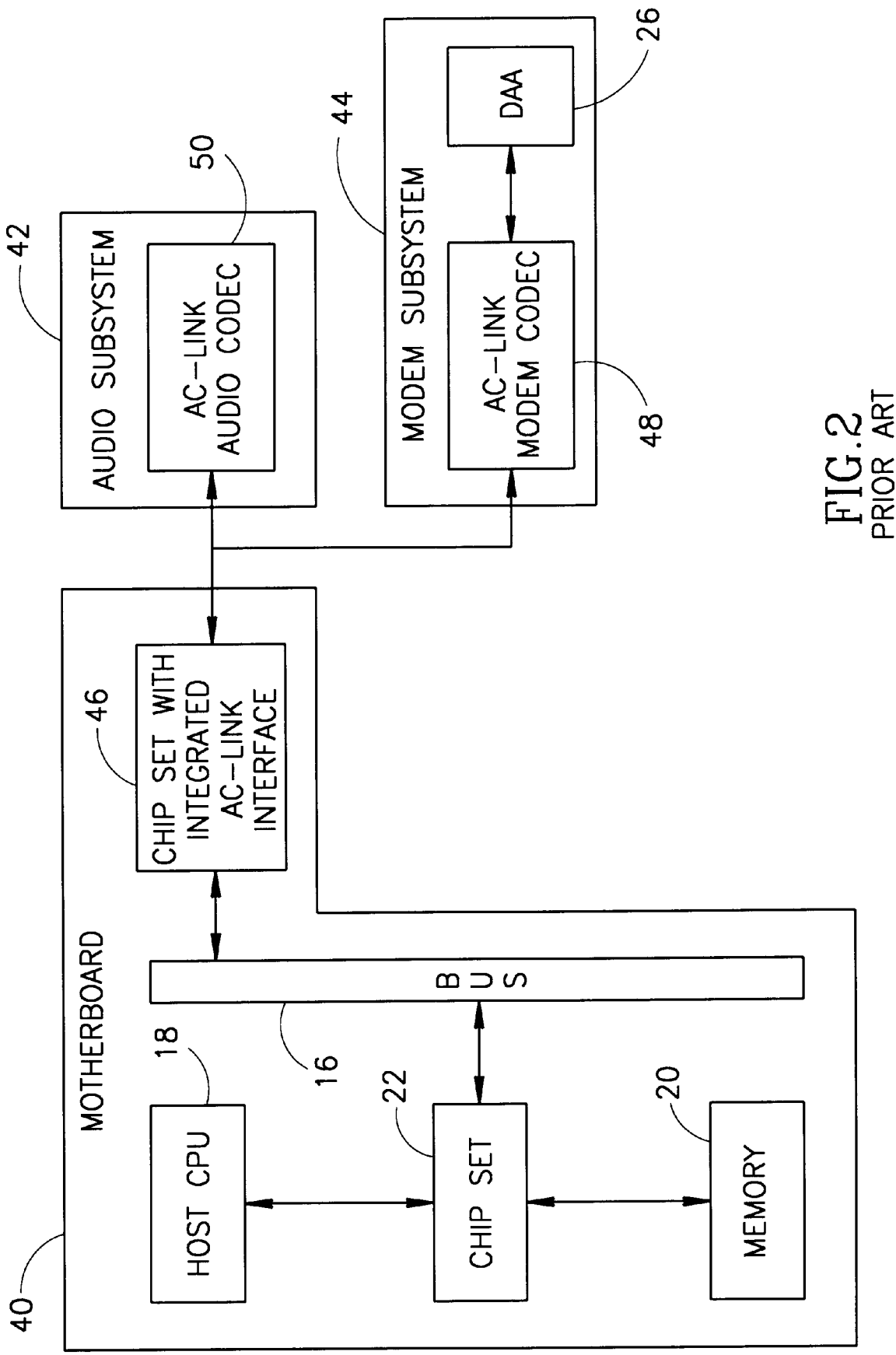
FIG. 2 is a schematic illustration of another prior art PC.
Figure 4:
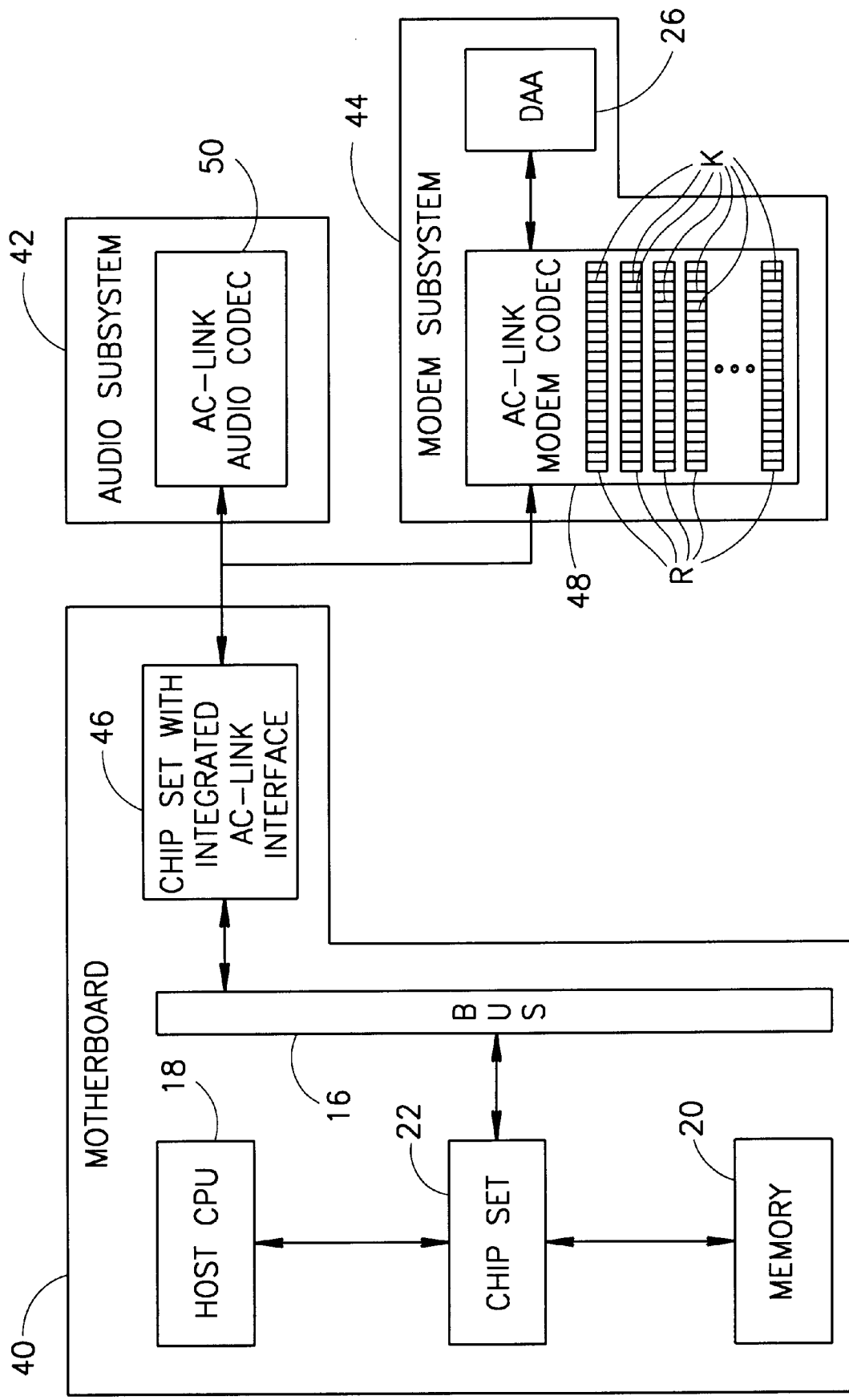
FIG. 4 is a schematic illustration of the PC of FIG. 2, with the assignment of key data to modem codec register bits unused by the AC'97 AC-link specification, in accordance with a preferred embodiment of the present invention.

According to a preferred embodiment of the present invention, the key is provided through the assignment of bit data to bits of at least one register in the modem codec. This is shown in FIG. 4, to which reference is now made, which is a schematic illustration of the PC of FIG. 2. The AC-link compatible modem codec 48 comprises a plurality of 16-bit registers R. In accordance with a preferred embodiment of the present invention, key data bits K are assigned to a subset of the modem codec register bits.

Reference is now made additionally to FIGS. 5A and 5B, which are a table of the codec register indices and usage according to the AC'97 AC-link specification. The first column lists the register numbers. The second column lists the register names. The next sixteen columns list the usage of the 16 bits in each register. Bits marked with an X are not used by the AC'97 AC-link specification. It can be seen that there are a large number of unused bits.

In accordance with a preferred embodiment of the present invention, the protection key described hereinabove can be provided through the assignment of bit data to bits unused by the AC-link protocol of at least one register in the modem codec. The key can constitute any number of bits, but preferably constitutes at least 32 bits. Preferably, key bits K are spread across several registers (for example, bits 6 and 7 of register 02 and bits 3, 4, 5, 6 and 7 of register 1A). Preferably, the bits are read only and hardwired. Typically, unused bits are read as high, say 1. In a preferred embodiment of the present invention, the bit data is assigned by installing pull-down transistors in the appropriate locations on the modem codec for those key bits whose value is low, say 0.

The AC-link bus has one slot for the codec register address and one slot for the codec register data. When the host CPU receives the data from the codec register data slot, all 16 bits of register data are received, even though only some of them are used by the AC-link protocol. Therefore, the key data bits are read together with the rest of the register data on the codec register data slot of the AC-link bus.

The provision of a key through the assignment of bit data to specific registers in the modem codec results in a non-standard, customized modem codec, since, preferably, the key has been hardwired into a subset of the reserved bits of the codec registers.

Figure 6:
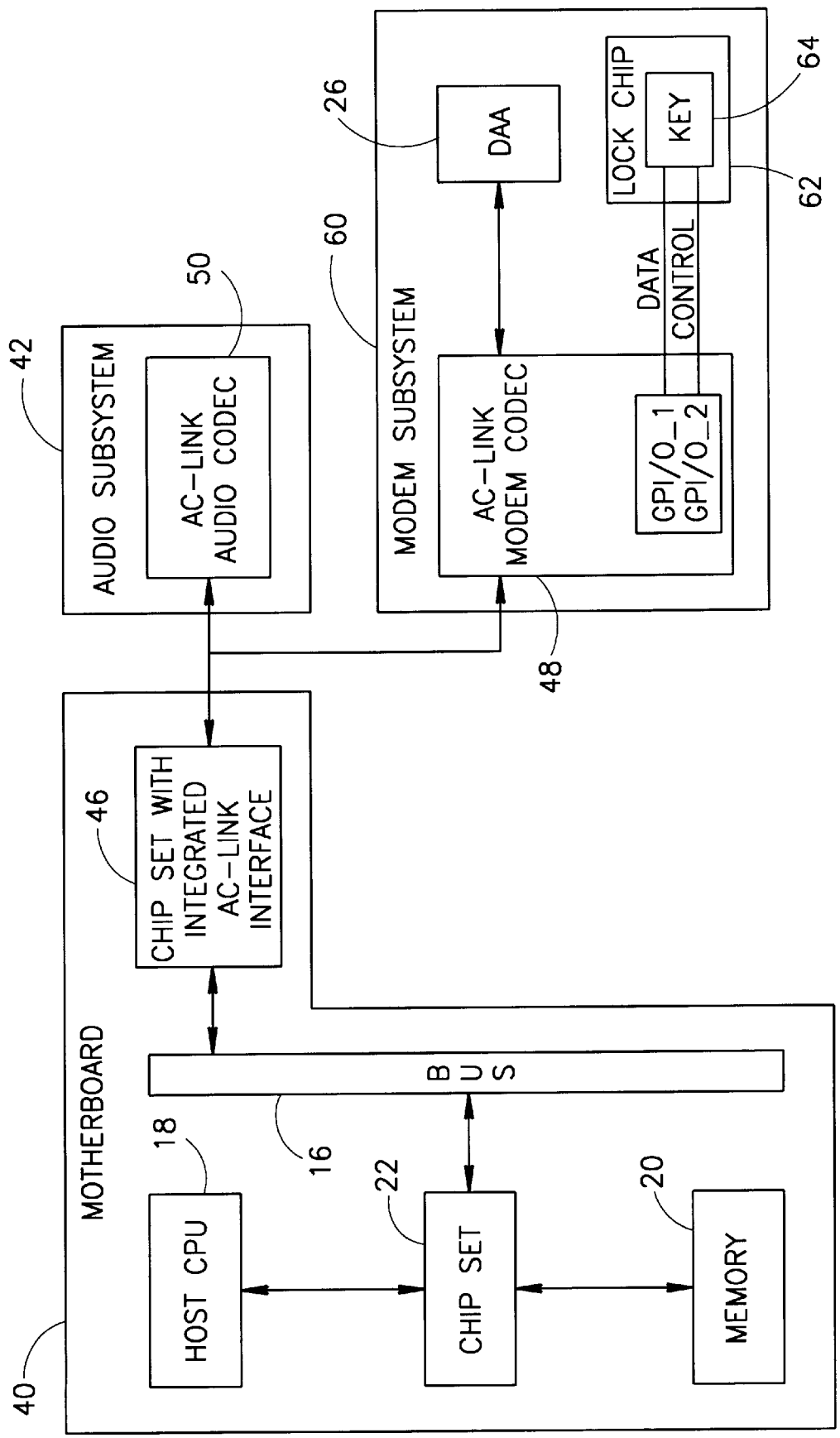
FIG. 6 is a schematic illustration of a PC, similar to the prior art PC of FIG. 2, but comprising a modem subsystem in accordance with another preferred embodiment of the present invention.
Figure 7:
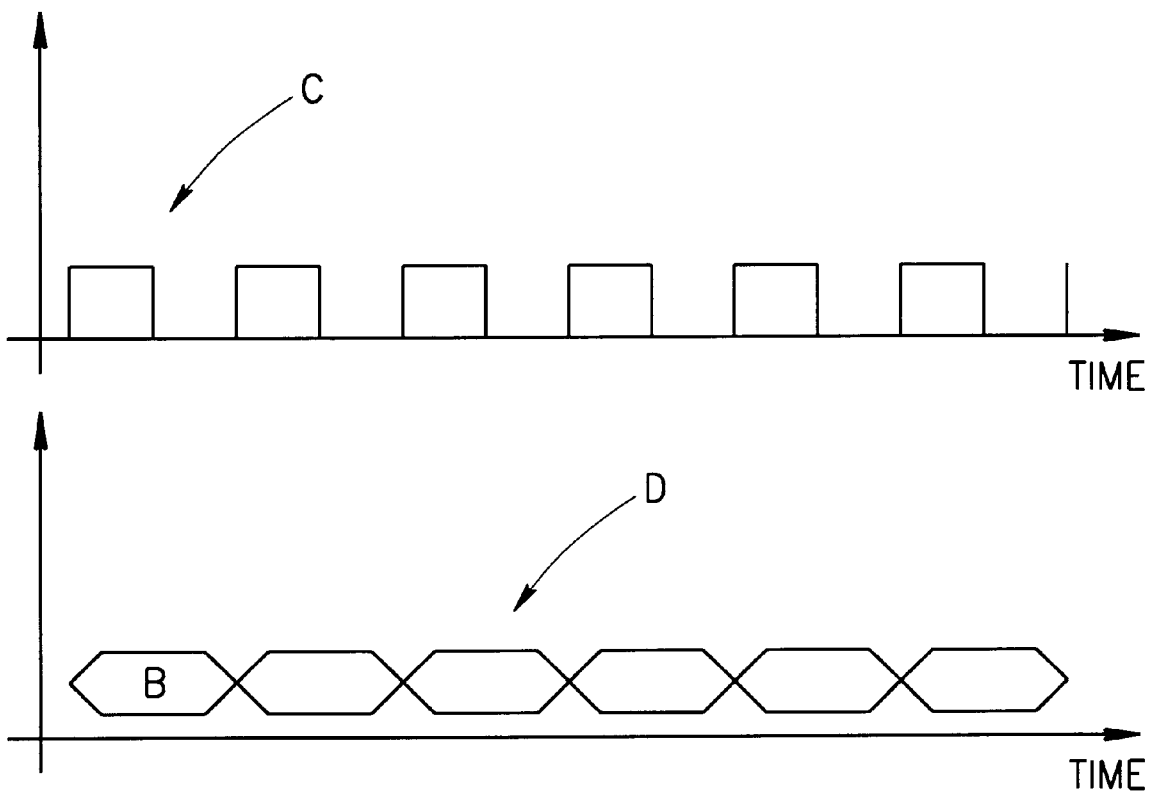
FIG. 7 is a schematic illustration of a single-read timing diagram, in accordance with a preferred embodiment of the present invention.
Figure 8:
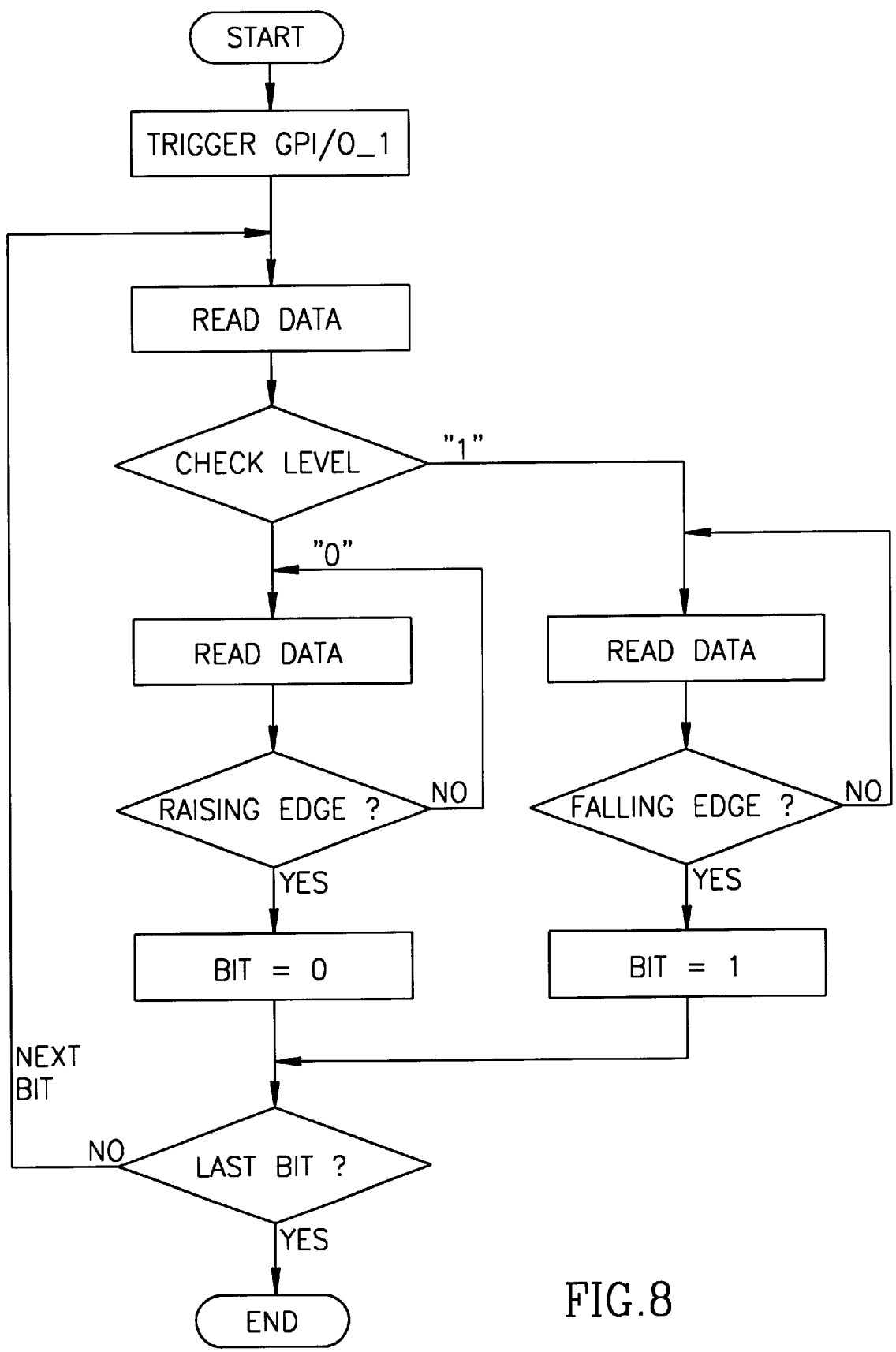
FIG. 8 is a schematic flowchart illustration of a single-read method, in accordance with a preferred embodiment of the present invention.

An alternate key provision system, which uses a standard modem codec with GPI/O pins and is compatible with a serial bus with designated time slots, is shown in FIGS. 6, 7 and 8, to which reference is now made. FIG. 6 is a schematic illustration of a PC, similar to the prior art PC of FIG. 2, but comprising a different modem subsystem 60, in accordance with another preferred embodiment of the present invention. The modem subsystem 60 comprises an AC-link compatible modem codec 48 having GPI/O pins, the DAA 26, and a lock chip 62. A key for the soft modem software is stored in encrypted or simple format in the lock chip 62. Preferably, the lock chip 62 includes a register 64 for storing the key.

A single-read method for reading the contents of the register 64 will be described hereinbelow with respect to FIGS. 7 and 8. Since a standard modem codec does not have the logic capability for reading another device, such as the lock chip 62, the read protocol is controlled by the host CPU 18.

FIG. 7 is a schematic illustration of a single-read timing diagram, in accordance with a preferred embodiment of the present invention, which shows a square control signal C and an output data stream D composed of bits B. The host CPU 66 sends the square control signal C over the bus 68 in the appropriate time slot designated for GPI/O write data. In response to the square control signal C, the lock chip 62 then sends the bits B of the key over the bus 68 in the appropriate time slot designated for GPI/O read data.

FIG. 8 is a schematic flowchart Illustration of an example single-read method, in accordance with a preferred embodiment of the present invention. The host CPU 66 sends (step 65) a single square of the control signal C, and then reads (step 67) a single bit B of the key. The host CPU 66 already knows from the soft modem software how many data bits of the key to read. If there are more bits to be read, then the host CPU 66 sends (step 65) another square of the control signal C. When all the data bits of the key have been read, the method ends.

Figure 9:
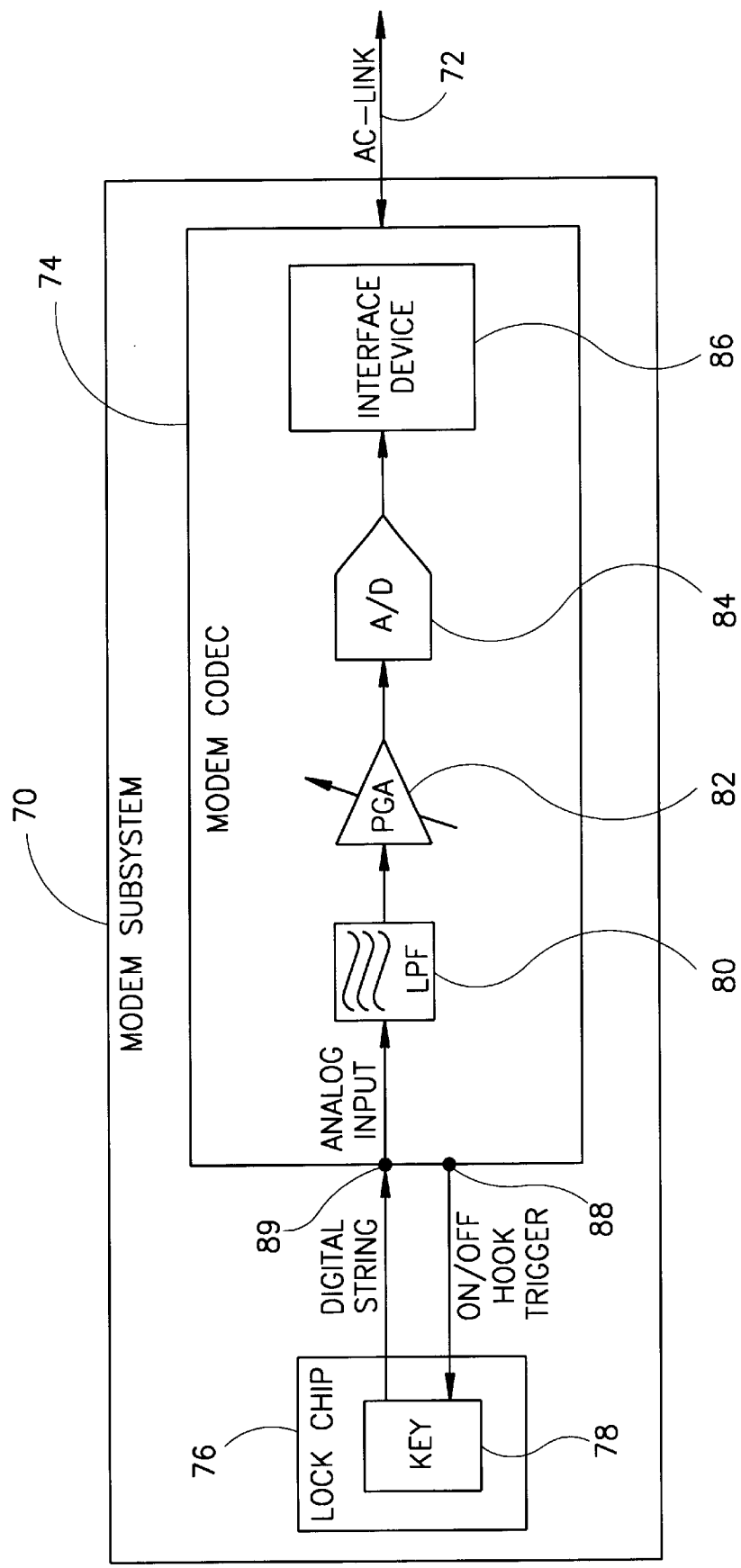
FIG. 9 is a schematic illustration of a modem subsystem, in accordance with a further preferred embodiment of the present invention.

Not all standard codecs have general purpose pins. An alternate key provision system which requires only the standard "on/off hook" pin used to control the DAA and the analog input of the modem codec, is shown in FIG. 9. FIG. 9 is a schematic illustration of a modem subsystem 70 in accordance with a preferred embodiment of the present invention. A host CPU (not shown) communicates with the modem subsystem 70 over an AC-link bus 72. The modem subsystem 70 comprises a modem codec 74 which is compatible with the serial bus 72, and a lock chip 76, in which a key for the soft modem software is stored in encrypted or simple format. Preferably, the lock chip 76 includes a register 78 for storing the key.

The modem codec 74 comprises a low pass filter (LPF) 80, a programmable gain amplifier (PGA) 82, an analog-to-digital (A/D) converter 84, and a device 86 for interfacing to the bus 72. The modem codec 74 also comprises an "on/off hook" pin 88 and an analog input pin 89.

The host CPU sends a control signal over the bus 72 to the lock chip 76, triggering the lock chip 76 via the on/off hook pin 88. The lock chip 76 then sends the bit data of the key to the analog input pin 89 of the modem codec 74, where it is filtered by the LPF 80, amplified by the PGA 82, and converted from analog to digital by the A/D converter 84. The digital output is then transmitted to the host CPU in any of the designated audio sample slots of the bus 72. The host CPU receives the samples and saves them in the PC memory (not shown).

Figure 10:
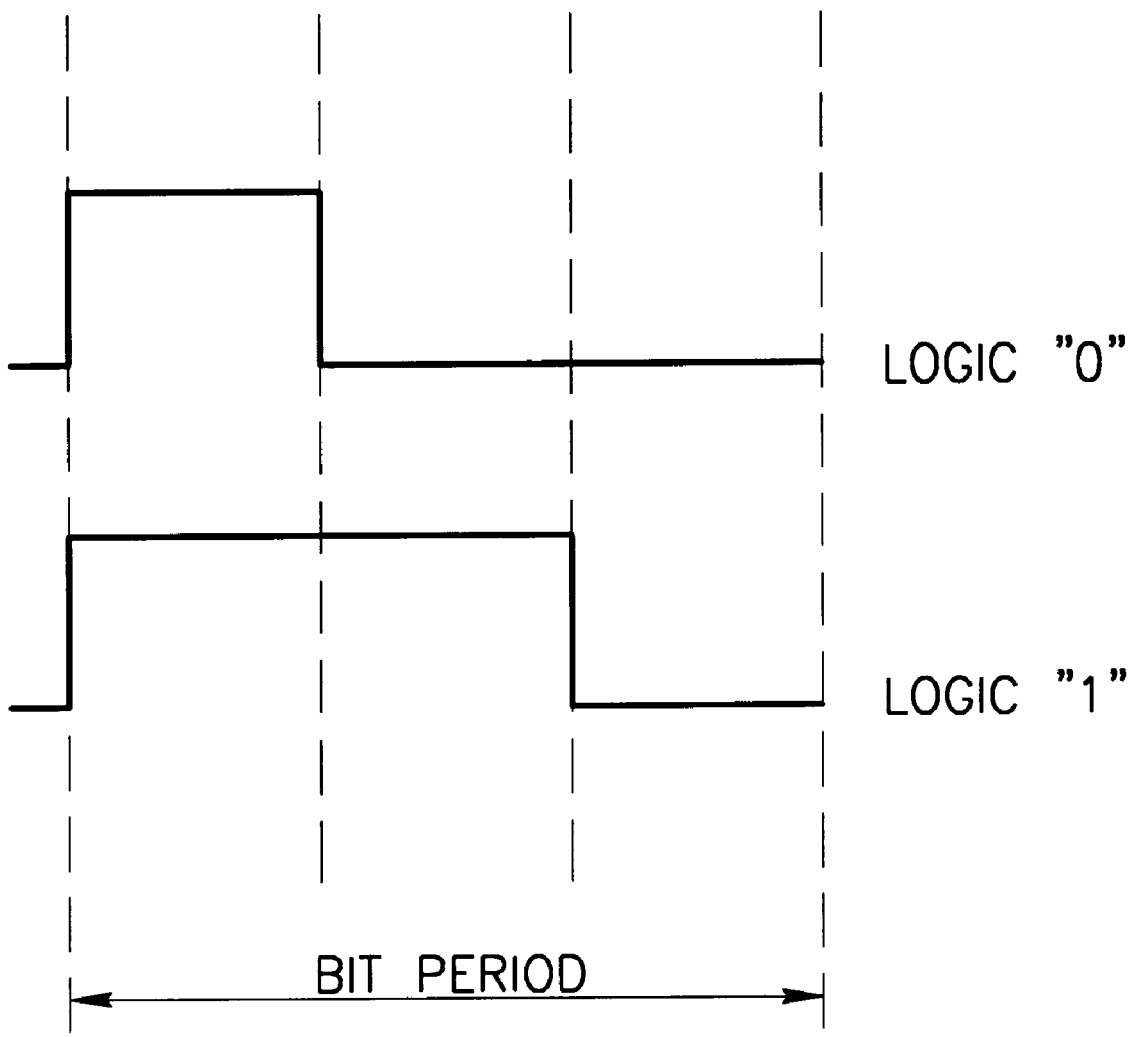
FIG. 10 is a schematic illustration of the Pulse Width Modulation (PWM) format of analog signals representing a logic "0" and a logic "1", helpful in understanding the present invention.

The representation of binary bits as analog signals is shown in FIG. 10, to which reference is now made. FIG. 10 is a schematic illustration of the Pulse Width Modulation (PWM) format of analog signals representing a logic "0" and a logic "1". The logic "0" signal is high for the first third of the signal, then low for the next two thirds. The logic "1" signal is high for the first two thirds of the signal, then low for the last third.

Figure 11:
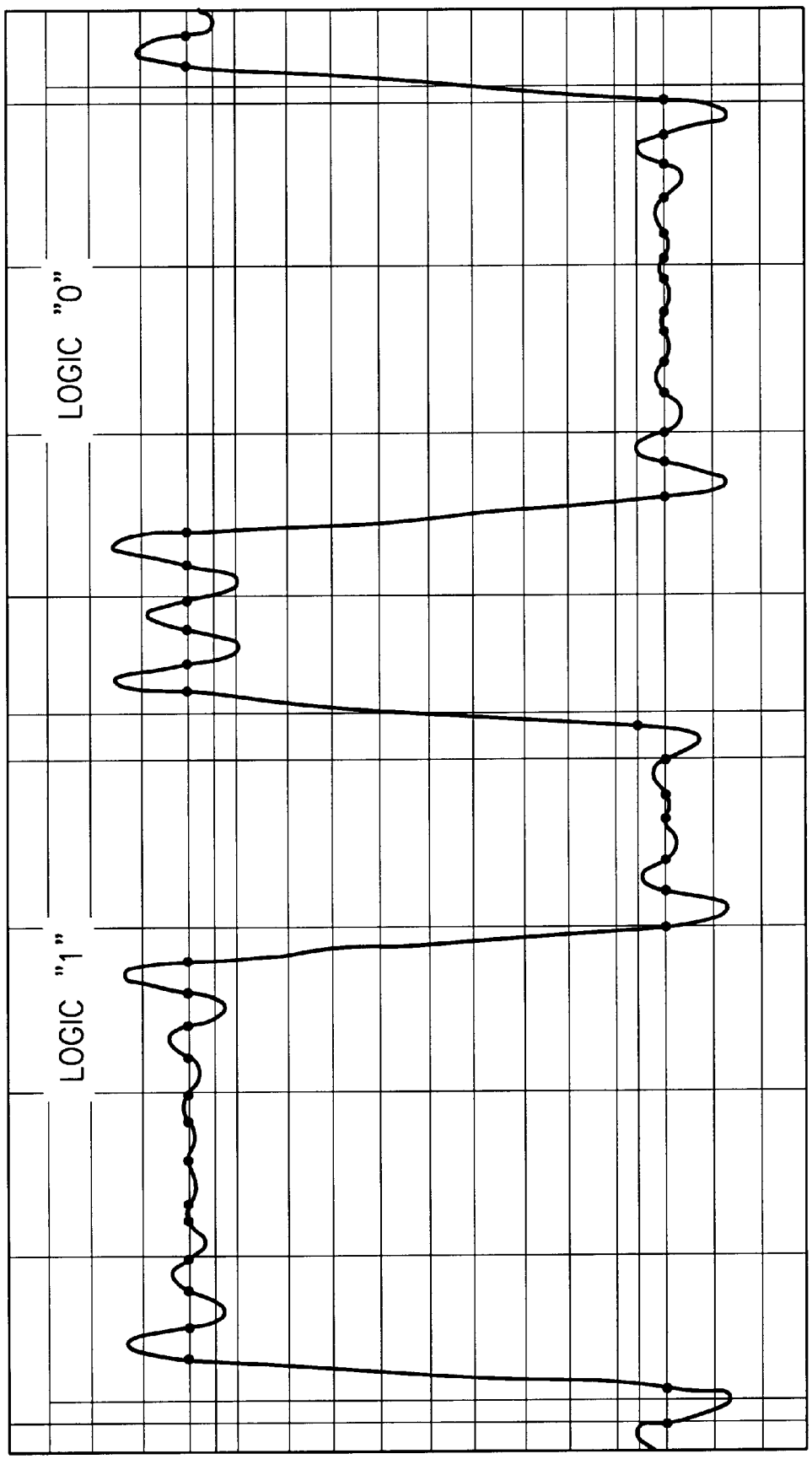
FIG. 11 is a schematic illustration of analog samples, helpful in understanding the present invention.

Reference is now made to FIG. 11, which is a schematic illustration of two bunches of samples, one representing logic "0" and the other one representing logic "1". Unlike the signals shown in FIG. 10, which show the concept of logic "0" and logic "1" as analog signals, FIG. 11 shows a schematic representation of noisy analog signals, and the analog values sampled by the host CPU. The host CPU then decodes the samples according to the PWM format to determine the bits of the key.

It will be appreciated that although the preferred embodiments of the present invention described above involve communications over the AC-link protocol, any serial bus with designated time slots can be used.

It will also be appreciated that the modem subsystem could be located on the motherboard or on a separate modem card.

Figure 12:
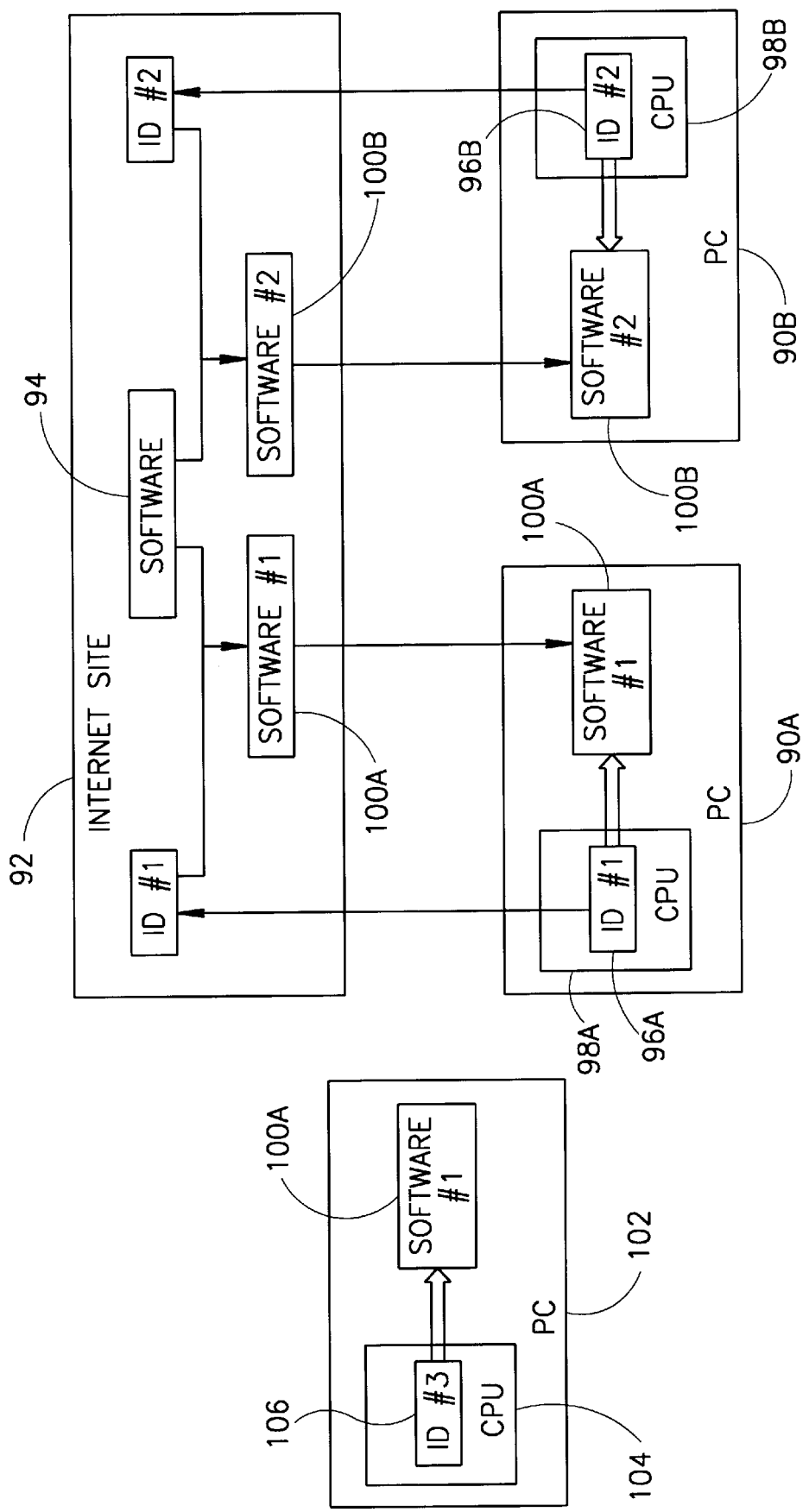
FIG. 12 is a schematic illustration of a system for downloading customized software, in accordance with an additional preferred embodiment of the present invention.

In accordance with an additional preferred embodiment of the present invention, the key is provided from a unique identifier attached to the CPU of a PC, as shown in FIG. 12, to which reference is now made. This embodiment is suitable for the protection of soft modem software downloaded from the Internet, as shown in FIG. 12, to which reference is now made. FIG. 12 is a schematic illustration of a system for downloading customized software, in accordance with an additional preferred embodiment of the present invention. Two personal computers 90A and 90B are connected to an Internet site 92 in order to download software 94 from the site 92. Each PC 90 includes a unique identifier 96. In a preferred embodiment, the unique identifier 96 is provided along with a CPU 98 of the PC 90, as is known in the art. The personal computers 90A and 90B send the unique identifiers 96A and 96B, respectively to the internet site 92, where they are used to generate customized versions 100A and 100B of the software 94, respectively. The customized versions 100A and 100B of the software 94 are downloaded to the computers 90A and 90B, respectively, where the CPUs 98A and 98B, respectively, can access and execute them. In operation, the customized software 100 reads the unique identifier 96 from the CPU 98 and compares it with the key contained in the customized software 100. The customized software 100 then handles the key with any or a combination of the handling methods described hereinabove, with the result that the customized software 100 runs properly only on the PC 90 whose CPU 98 has the unique identifier 96. If, for example, the customized software 100A is copied to another PC 102, whose CPU 104 has a unique identifier 106, then in operation, the customized software 100A will read the unique identifier 106 and compare it with the key 96A contained in the customized software 100. Since the unique identifier 106 is incompatible with the key, the customized software 100 will behave as described hereinabove with regard to the key handling methods, and will not run properly on the PC 102.

In a preferred embodiment of the present invention, the compiled object code of the software 94 is overwritten in at least one predetermined location with at least one number related to the unique identifier 96, in order to produce the customized version 100. For example, the at least one predetermined location might refer to the "1" in a computer statement:

```
if (key == 1) {
    .../* handle the key */
}
```

When the compiled object code is overwritten with the number related to the unique identifier 96, say the number 8439486765821, it is as if the computer statement was:

```
if (key == 8439486765821) {
. . . /* handle the key */
}
```

In other words, the customized version 100 of the software 94 has information related to the unique identifier 96 embedded directly in the code.

In another preferred embodiment of the present invention, the software 94 is written to accept at least one parameter, as is known in the art, the at least one parameter representing information related to the unique identifier 96. The software 94 is then compiled with the at least one parameter as is known in the art, in order to produce the customized version 100.

It will be appreciated that the unique identifier of the computer can belong to any hardware device of the computer.

It will be appreciated by persons skilled in the art that the present invention is not limited by what has been particularly shown and described herein above. Rather the scope of the invention is defined by the claims that follow.

What is claimed is:

1. A system which uses a key for soft modem software protection on a computer having a CPU, a modem codec having registers, and a serial bus having designated time slots, at least one of said time slots being designated for data of said registers, the system comprising:

bit data of said key stored in a subset of the bits of at least one of said registers;

means for transmitting said bit data from said at least one register to said CPU in said at least one register data time slot;

a second key associated with said soft modem software; and means for altering operation of said soft modem software if said transmitted bit data is incompatible with said associated second key, wherein said means for alteration is configured to become operative a predetermined amount of time after said soft modem software becomes operative.

2. A system which uses a key for soft modem software protection on a computer having a CPU, a modem codec having registers, and a serial bus having designated time slots, at least one of said time slots being designated for data of said registers, the system comprising:

bit data of said key stored in a subset of the bits of at least one of said registers;

means for transmitting said bit data from said at least one register to said CPU in said at least one register data time slot;

a second key associated with said soft modem software; and means for altering operation of said soft modem software if said transmitted bit data is incompatible with said associated second key, wherein said means for alteration is configured to become operative a random amount of time after said soft modem software becomes operative.

3. A system which uses a key for soft modem software protection on a computer having a CPU, a modem codec having general purpose input output (GPI/O) pins, a hardware device connected to said GPI/O pins, and a serial bus having designated time slots, at least one of said time slots designated for GPI/O read data and at least one of said time slots designated for GPI/O write data, the system comprising:

bit data of said key stored in said hardware device;

means for transmitting at least one control signal from said CPU to said modem codec over said at least one time slot designated for GPI/O write data;

means for transmitting said at least one control signal from said modem codec to said hardware device over said GPI/O output pin;

means for reading said bit data from said hardware device to said modem codec over said GPI/O input pin;

means for transmitting said bit data from said modem codec to said CPU over said at least one GPI/O read data time slot;

a second key associated with said soft modem software; and means for altering operation of said soft modem software if said transmitted bit data is incompatible with said associated second key, wherein said means for alteration is configured to become operative a predetermined amount of time after said soft modem software becomes operative.

4. A system which uses a key for soft modem software protection on a computer having a CPU, a modem codec having general purpose input output (GPI/O) pins, a hardware device connected to said GPI/O pins, and a serial bus having designated time slots, at least one of said time slots designated for GPI/O read data and at least one of said time slots designated for GPI/O write data, the system comprising:

bit data of said key stored in said hardware device;

means for transmitting at least one control signal from said CPU to said modem codec over said at least one time slot designated for GPI/O write data;

means for transmitting said at least one control signal from said modem codec to said hardware device over said GPI/O output pin;

means for reading said bit data from said hardware device to said modem codec over said GPI/O input pin;

means for transmitting said bit data from said modem codec to said CPU over said at least one GPI/O read data time slot;

a second key associated with said soft modem software; and means for altering operation of said soft modem software if said transmitted bit data is incompatible with said associated second key, wherein said means for alteration is configured to become operative a random amount of time after said soft modem software becomes operative.

5. A system which uses a key for soft modem software protection on a computer having a CPU, a modem codec having an on/off hook pin and an analog input pin, a hardware device connected to said on/off hook pin and said analog input pin, and a serial bus having designated time slots, at least one of said time slots designated for analog input data and at least one of said time slots designated for GPI/O write data, the system comprising:

bit data of said key stored in said hardware device;

means for transmitting at least one control signal from said CPU to said modem codec over said at least one time slot designated for GPI/O write data;

means for transmitting at least one trigger signal from said modem codec to said hardware device over said on/off hook pin;

means for reading said bit data from said hardware device to said modem codec over said analog input pin;

means for transmitting said bit data from said modem codec to said CPU over said at least one analog input data time slot;

a second key associated with said soft modem software; and means for altering operation of said soft modem software if said transmitted bit data is incompatible with said associated second key, wherein said means for alteration is configured to become operative a predetermined amount of time after said soft modem software becomes operative.

6. A system which uses a key for soft modem software protection on a computer having a CPU, a modem codec having an on/off hook pin and an analog input pin, a hardware device connected to said on/off hook pin and said analog input pin, and a serial bus having designated time slots, at least one of said time slots designated for analog input data and at least one of said time slots designated for GPI/O write data, the system comprising:

bit data of said key stored in said hardware device;

means for transmitting at least one control signal from said CPU to said modem codec over said at least one time slot designated for GPI/O write data;

means for transmitting at least one trigger signal from said modem codec to said hardware device over said on/off hook pin;

means for reading said bit data from said hardware device to said modem codec over said analog input pin;

means for transmitting said bit data from said modem codec to said CPU over said at least one analog input data time slot;

a second key associated with said soft modem software; and means for altering operation of said soft modem software if said transmitted bit data is incompatible with said associated second key, wherein said means for alteration is configured to become operative a random amount of time after said soft modern software becomes operative.

7. A system for protecting soft modem software on a computer having a CPU, the system comprising:

a first key associated with said soft modem software;

a second key stored in a hardware device on said computer;

means for transmitting said second key from said hardware device to said CPU; and means for altering operation of said soft modem software if said transmitted second key is incompatible with said associated first key, wherein said means for alteration is configured to become operative a predetermined amount of time after said soft modem software becomes operative.

8. A system for protecting soft modem software on a computer having a CPU, the system comprising:

a first key associated with said soft modem software;

a second key stored in a hardware device on said computer;

means for transmitting said second key from said hardware device to said CPU; and means for altering operation of said soft modem software if said transmitted second key is incompatible with said associated first key, wherein said means for alteration is configured to become operative a random amount of time after said soft modem software becomes operative.

9. A system for protecting soft modem software, the system comprising:

a local computer having a unique key;

an external computer for receiving said key from said local computer when said local computer accesses said external computer in order to download said software, for embedding information related to said key in a customized version of said software, and for downloading said customized version to said local computer; and means for altering operation of said customized version, said means for altering including at least one of a group including the following: means for stopping execution of said customized version, means for limiting the operation of said customized version to predetermined service level, and means for changing data samples passing through said customized version in a magnitude and frequency which prevents useful communication, wherein said means for alteration is configured to become operative a predetermined amount of time after said customized version becomes operative.

10. A system for protecting soft modem software, the system comprising:

a local computer having a unique key;

an external computer for receiving said key from said local computer when said local computer accesses said external computer in order to download said software, for embedding information related to said key in a customized version of said software, and for downloading said customized version to said local computer; and means for altering operation of said customized version, said means for altering including at least one of a group including the following: means for stopping execution of said customized version, means for limiting the operation of said customized version to predetermined service level, and means for changing data samples passing through said customized version in a magnitude and frequency which prevents useful communication, wherein said means for alteration is configured to become operative a random amount of time after said customized version becomes operative.

11. A method which uses a key for soft modem software protection on a computer having a CPU, a modem codec having registers, and a serial bus having designated time slots, at least one of said time slots being designated for data of said registers, the method comprising the steps of:

storing bit data of said key in a subset of the bits of at least one of said registers;

transmitting said bit data from said at least one register to said CPU in said at least one register data time slot;

associating a second key with said soft modem software; and altering operation of said soft modem software if said transmitted bit data is incompatible with said second key, wherein said alteration step begins a predetermined amount of time after operation of said soft modem software begins.

12. A method which uses a key for soft modem software protection on a computer having a CPU, a modem codec having registers, and a serial bus having designated time slots, at least one of said time slots being designated for data of said registers, the method comprising the steps of:

storing bit data of said key in a subset of the bits of at least one of said registers;

transmitting said bit data from said at least one register to said CPU in said at least one register data time slot;

associating a second key with said soft modem software; and altering operation of said soft modem software if said transmitted bit data is incompatible with said second key, wherein said alteration step begins a random amount of time after operation of said soft modem software begins.

13. A method which uses a key for soft modem software protection on a computer having a CPU, a modem codec having general purpose input output (GPI/O) pins, a hardware device connected to said 10 GPI/O pins, and a serial bus having designated time slots, at least one of said time slots designated for GPI/O read data and at least one of said time slots designated for GPI/O write data, the method comprising the steps of:

storing bit data of said key in said hardware device;

transmitting at least one control signal from said CPU to said modem codec over said at least one time slot designated for GPI/O write data;

transmitting said at least one control signal from said modem codec to said hardware device over said GPI/O output pin;

reading said bit data from said hardware device to said modem codec over said GPI/O input pin;

transmitting said bit data from said modem codec to said CPU over said at least one GPI/O read data time slot;

associating a second key with said soft modem software; and altering operation of said soft modem software if said transmitted key is incompatible with said second key, wherein said alteration step begins a predetermined amount of time after operation of said soft modem software begins.

14. A method which uses a key for soft modem software protection on a computer having a CPU, a modem codec having general purpose input output (GPI/O) pins, a hardware device connected to said 10 GPI/O pins, and a serial bus having designated time slots, at least one of said time slots designated for GPI/O read data and at least one of said time slots designated for GPI/O write data, the method comprising the steps of:

storing bit data of said key in said hardware device;

transmitting at least one control signal from said CPU to said modem codec over said at least one time slot designated for GPI/O write data;

transmitting said at least one control signal from said modem codec to said hardware device over said GPI/O output pin;

reading said bit data from said hardware device to said modem codec over said GPI/O input pin;

transmitting said bit data from said modem codec to said CPU over said at least one GPI/O read data time slot;

associating a second key with said soft modem software; and altering operation of said soft modem software if said transmitted key is incompatible with said second key, wherein said alteration step begins a random amount of time after operation of said soft modem software begins.

15. A method which uses a key for soft modem software protection on a computer having a CPU, a modem codec having an on/off hook pin and an analog input pin, a hardware device connected to said on/off hook pin and said analog input pin, and a serial bus having designated time slots, at least one of said time slots designated for analog input data and at least one of said time slots designated for GPI/O write data, the method comprising the steps of:

storing bit data of said key in said hardware device;

transmitting at least one control signal from said CPU to said modem codec over said at least one time slot designated for GPI/O write data;

transmitting said at least one trigger signal from said modem codec to said hardware device over said on/off hook pin;

reading said bit data from said hardware device to said modem codec over said analog input pin;

transmitting said bit data from said modem codec to said CPU over said at least one analog input data time slot;

associating a second key with said soft modem software; and altering operation of said soft modem software if said transmitted key is incompatible with said second key, wherein said alteration step begins a predetermined amount of time after operation of said soft modem software begins.

16. A method which uses a key for soft modem software protection on a computer having a CPU, a modem codec having an on/off hook pin and an analog input pin, a hardware device connected to said on/off hook pin and said analog input pin, and a serial bus having designated time slots, at least one of said time slots designated for analog input data and at least one of said time slots designated for GPI/O write data, the method comprising the steps of:

storing bit data of said key in said hardware device;

transmitting at least one control signal from said CPU to said modem codec over said at least one time slot designated for GPI/O write data;

transmitting said at least one trigger signal from said modem codec to said hardware device over said on/off hook pin;

reading said bit data from said hardware device to said modem codec over said analog input pin;

transmitting said bit data from said modem codec to said CPU over said at least one analog input data time slot;

associating a second key with said soft modem software; and altering operation of said soft modem software if said transmitted key is incompatible with said second key, wherein said alteration step begins a random amount of time after operation of said soft modem software begins.

17. A method for protecting soft modem software on a computer having a CPU, a serial bus having designated time slots, and a modem subsystem, the method comprising the steps of:

associating a first key with said soft modem software;

storing a second key in a hardware device in said modem subsystem;

transmitting said second key from said hardware device to said CPU in at least one of said designated time slots; and altering operation of said soft modem software if said transmitted second key is incompatible with said associated first key, wherein said alteration step begins a predetermined amount of time after operation of said soft modem software begins.

18. A method for protecting soft modem software on a computer having a CPU, a serial bus having designated time slots, and a modem subsystem, the method comprising the steps of:

associating a first key with said soft modem software;

storing a second key in a hardware device in said modem subsystem;

transmitting said second key from said hardware device to said CPU in at least one of said designated time slots; and altering operation of said soft modem software if said transmitted second key is incompatible with said associated first key, wherein said alteration step begins a random amount of time after operation of said soft modem software begins.

19. A method for protecting soft modem software to be downloaded from an external computer to a local computer having a unique key, the method comprising the steps of:

sending said unique key to said external computer; generating a customized version of said modem software with which said key is associated;

downloading said customized version to said local computer;

reading said unique key from said local computer; and altering operation of said customized version if said read key is incompatible with said associated key, wherein said alteration step includes at least one of the following steps:

stopping execution of said customized version, limiting the operation of said customized version to a predetermined service level, and changing data samples passing through said customized version at a predefined magnitude and frequency, and wherein said alteration step begins a predetermined amount of time after operation of said customized version begins.

20. A method for protecting soft modem software to be downloaded from an external computer to a local computer having a unique key, the method comprising the steps of:

sending said unique key to said external computer; generating a customized version of said modem software with which said key is associated;

downloading said customized version to said local computer;

reading said unique key from said local computer; and altering operation of said customized version if said read key is incompatible with said associated key, wherein said alteration step includes at least one of the following steps:

stopping execution of said customized version, limiting the operation of said customized version to a predetermined service level, and changing data samples passing through said customized version at a predefined magnitude and frequency, and wherein said alteration step begins a random amount of time after operation of said customized version begins.

21. A method which uses a key for soft modem software protection on a computer having a CPU, a modem codec having registers, and a serial bus having designated time slots, at least one of said time slots being designated for data of said registers, the method comprising the steps of:

storing bit data of said key in a subset of the bits of at least one of said registers;

transmitting said bit data from said at least one register to said CPU in said at least one register data time slot;

associating a second key with said soft modem software; and altering operation of said soft modem software if said transmitted bit data is incompatible with said second key, wherein said step of alteration further includes the step of stopping installation of said modem software.

22. A method for controlling soft modem software to be run on a central processing unit (CPU) of a computer, the method comprising:

storing first key data in at least one of a plurality of registers provided on a modem codec;

coupling the modem codec to communicate over a serial bus with the CPU, in accordance with a protocol operative on the serial bus;

transmitting the first key data from the modem codec to the CPU over the serial bus; and if the first key data transmitted to the CPU do not match second key data associated with the soft modem software, inhibiting communication by the CPU via the modem codec using the soft modem software.

23. The method according to claim 22, wherein inhibiting the communication comprises inhibiting installation of the soft modem software.

24. The method according to claim 22, wherein inhibiting the communication comprises modifying operation of the soft modem software.

25. The method according to claim 22, wherein the protocol operative on the serial bus assigns a respective, predetermined time slot to each of the plurality of the registers provided on the modem codec, and wherein transmitting the first key data comprises transmitting the first key data from the modem codec to the CPU in the time slot assigned to the at least one of the plurality of registers in which the key data are stored.

26. A system for protection of soft modem software, comprising:

a modem codec, comprising a plurality of registers, at least one of the registers storing first key data;

a serial bus, coupled to the modem codec;

a memory, which is arranged to store second key data associated with the soft modem software; and a central processing unit (CPU), which is adapted to run the soft modem software and is coupled via the serial bus to communicate with the modem codec in accordance with a protocol operative on the serial bus so as to receive the first key data from the modem codec, and which is further adapted to compare the first key data to the second key data stored in the memory and, if the first key data transmitted to the CPU do not match the second key data, to inhibit communication using the soft modem software via the modem codec.

27. The system according to claim 26, wherein the CPU is adapted to inhibit the communication by inhibiting installation of the soft modem software.

28. The system according to claim 26, wherein the CPU is adapted to inhibit the communication by modifying operation of the soft modem software.

29. The system according to claim 26, wherein the protocol operative on the serial bus assigns a respective, predetermined time slot to each of the plurality of the registers provided on the modem codec, and wherein the modem codec is operative to transmit the first key data to the CPU in the time slot assigned to the at least one of the plurality of registers in which the key data are stored.

* * * * *

UNITED STATES PATENT AND TRADEMARK OFFICE
CERTIFICATE OF CORRECTION

PATENT NO. : 6,715,079 B1
DATED : March 30, 2004
INVENTOR(S) : Binyamin Maytal et al.

It is certified that error appears in the above-identified patent and that said Letters Patent is hereby corrected as shown below:

<u>Title page,</u>
Item [73], insert: -- Assignee: Smart Link Ltd, Nethanya, Israel --

Signed and Sealed this

Twenty-first Day of June, 2005

JON W. DUDAS
*Director of the United States Patent and Trademark Office*